United States Patent
Sköld et al.

(10) Patent No.: US 11,510,430 B2
(45) Date of Patent: Nov. 29, 2022

(54) NUTRITIONAL SUPPLEMENTS

(71) Applicant: LAMINARIA GROUP AB, Gothenburg (SE)

(72) Inventors: Olov Sköld, Gothenburg (SE); Anna Ström, Partille (SE); Martin Ahnoff, Gothenburg (SE)

(73) Assignee: LAMINARIA GROUP AB, Gothenburg (SE)

( * ) Notice: Subject to any disclaimer, the term of this patent is extended or adjusted under 35 U.S.C. 154(b) by 0 days.

(21) Appl. No.: 16/096,619

(22) PCT Filed: Apr. 28, 2017

(86) PCT No.: PCT/EP2017/060261
§ 371 (c)(1),
(2) Date: Oct. 25, 2018

(87) PCT Pub. No.: WO2017/186940
PCT Pub. Date: Nov. 2, 2017

(65) Prior Publication Data
US 2019/0133171 A1    May 9, 2019

(30) Foreign Application Priority Data

Apr. 29, 2016 (SE) .................................. 1630098-0
Mar. 3, 2017 (SE) .................................. 1730056-7

(51) Int. Cl.
*A23L 33/125*   (2016.01)
*A23L 2/38*   (2021.01)
(Continued)

(52) U.S. Cl.
CPC .............. *A23L 33/125* (2016.08); *A23L 2/38* (2013.01); *A23L 2/52* (2013.01); *A23L 29/231* (2016.08);
(Continued)

(58) Field of Classification Search
CPC . A23L 33/125; A23L 2/38; A23L 2/52; A23L 29/231; A23L 29/256; A23L 29/30;
(Continued)

(56) References Cited

U.S. PATENT DOCUMENTS 2,935,409 A   5/1960   McDowell et al.
5,866,190 A   2/1999   Barey
(Continued)

FOREIGN PATENT DOCUMENTS

DE   29701817         3/1997
EP   2098124 A1  *   9/2009   ............... A23L 1/09
(Continued)

OTHER PUBLICATIONS

McEntee et al., "Tunable Transport of Glucose Through Ionically-Crosslinked Alginate Gels: Effect of Alginate and Calcium Concentration", Journal of Applied Polymer Science, DOI 10.1002/app. 27478, 2007, 2956-2962.

(Continued)

*Primary Examiner* — Katherine D Leblanc
(74) *Attorney, Agent, or Firm* — James S. Keddie; Bozicevic, Field & Francis LLP

(57) ABSTRACT

The present invention provides nutritional supplements comprising alginate, in combination with pectin, which will form hydrogels in the stomach when exposed to the low pH of the gastric juice. The formation of a hydrogel will lead to delayed release of sugars and other active ingredients in the stomach. The nutritional supplements can comprise high concentrations of sugars and complex carbohydrates without causing unwanted gastrointestinal symptoms.

30 Claims, 3 Drawing Sheets

Figure 1:
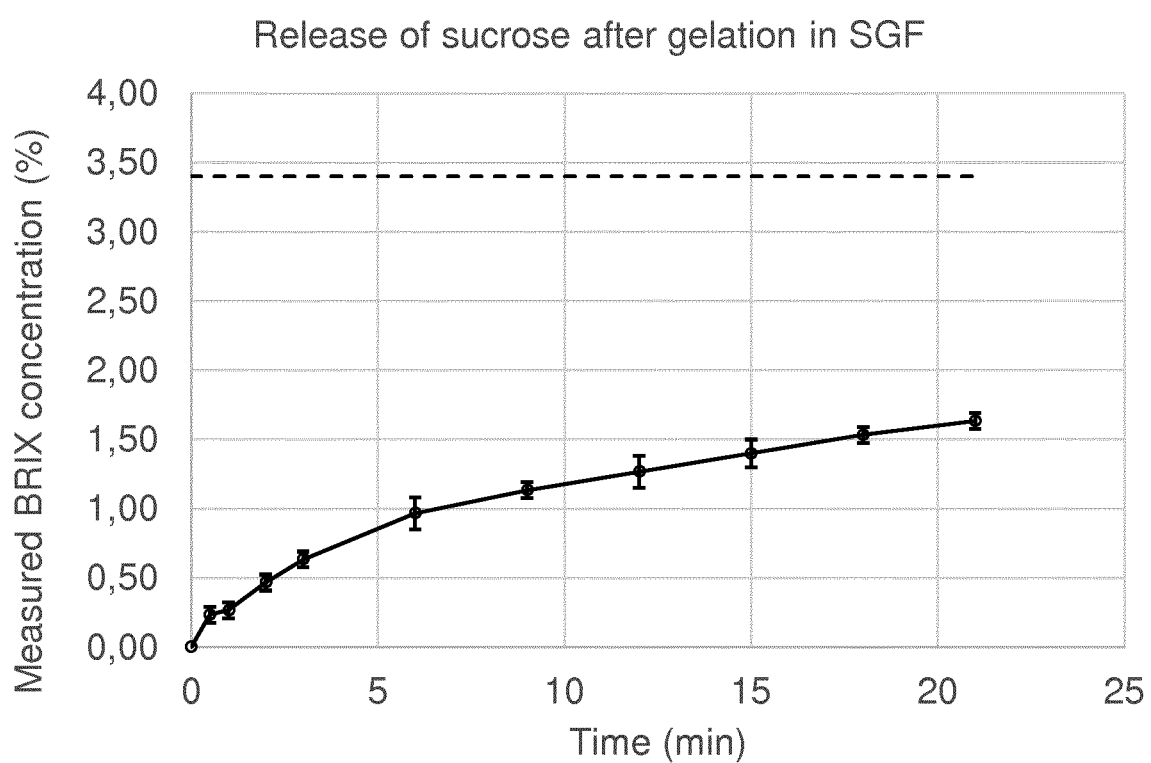

(51) Int. Cl.

| | |
|---|---|
| A23L 2/52 | (2006.01) |
| A23L 29/231 | (2016.01) |
| A23L 29/256 | (2016.01) |
| A23L 29/30 | (2016.01) |
| A23L 33/175 | (2016.01) |
| A23L 33/105 | (2016.01) |
| A23L 33/16 | (2016.01) |
| A23L 33/15 | (2016.01) |
| A23L 33/10 | (2016.01) |

(52) U.S. Cl.
CPC .............. *A23L 29/256* (2016.08); *A23L 29/30* (2016.08); *A23L 33/10* (2016.08); *A23L 33/105* (2016.08); *A23L 33/15* (2016.08); *A23L 33/16* (2016.08); *A23L 33/175* (2016.08); *A23V 2002/00* (2013.01); *A23V 2200/33* (2013.01); *A23V 2250/06* (2013.01); *A23V 2250/16* (2013.01); *A23V 2250/161* (2013.01); *A23V 2250/1614* (2013.01); *A23V 2250/1642* (2013.01); *A23V 2250/21* (2013.01); *A23V 2250/5026* (2013.01); *A23V 2250/50722* (2013.01); *A23V 2250/5114* (2013.01); *A23V 2250/5118* (2013.01); *A23V 2250/606* (2013.01); *A23V 2250/61* (2013.01); *A23V 2250/62* (2013.01); *A23V 2250/628* (2013.01); *A23V 2250/708* (2013.01)

(58) Field of Classification Search
CPC ........ A23L 33/105; A23L 33/15; A23L 33/16; A23L 33/175; A23V 2002/00; A23V 2200/33; A23V 2250/06; A23V 2250/16; A23V 2250/161; A23V 2250/1614; A23V 2250/1642; A23V 2250/21; A23V 2250/5026; A23V 2250/50722; A23V 2250/5114; A23V 2250/5118; A23V 2250/606; A23V 2250/61; A23V 2250/62; A23V 2250/628; A23V 2250/708

See application file for complete search history.

(56) References Cited

U.S. PATENT DOCUMENTS

| | | | |
|---|---|---|---|
| 5,980,968 | A | 11/1999 | Booth |
| 6,165,503 | A | 12/2000 | Gaserod et al. |
| 2003/0118712 | A1 | 6/2003 | Koren et al. |
| 2005/0170059 | A1 | 8/2005 | Aldred et al. |
| 2007/0082029 | A1 | 4/2007 | Aimutis et al. |
| 2007/0082114 | A1* | 4/2007 | Catani ............... A23L 2/52 426/617 |
| 2009/0155409 | A1 | 6/2009 | Sexton et al. |
| 2011/0195157 | A1 | 8/2011 | Niichel |
| 2014/0037830 | A1 | 2/2014 | Sexton et al. |
| 2015/0118365 | A1 | 4/2015 | Hollenkamp |
| 2016/0143330 | A1 | 5/2016 | Inoue et al. |
| 2018/0000743 | A1 | 1/2018 | Welker et al. |

FOREIGN PATENT DOCUMENTS

| | | |
|---|---|---|
| SE | 512093 | 1/2000 |
| WO | WO 98/20755 A1 | 5/1998 |
| WO | WO 99/56563 A2 | 11/1999 |
| WO | WO 02/094224 | 11/2002 |
| WO | WO 2005/020719 A1 | 3/2005 |
| WO | WO 2007/039294 A2 | 4/2007 |
| WO | WO 2007/044511 A1 | 4/2007 |
| WO | WO 2008/022857 A1 | 2/2008 |
| WO | WO 2011/063817 | 6/2011 |
| WO | WO 2011/071699 A1 | 6/2011 |
| WO | WO 2014/209106 A1 | 12/2014 |

OTHER PUBLICATIONS

Msagati, T. A. M. "Microencapsulation and Bioencapsulation" In: Chemistry of Food Additives and Preservatives, West Sussex: John Wiley & Sons, ltd., 2013, p. 295-302, ISBN 978-1-118-27414-9.

"Nutrition and Athletic Performance", American College of Sports Medicine, American Dietetic Association Dietitians of Canada, Official Journal of the American College of Sports Medicine, pp. 709-731.

Khoury et al., "Effect of sodium alginate addition to chocolate milk on glycemia, insulin, appetite and food intake in healthy adult men", European Journal of Clinical Nutrition, 2014, 68: 613-618.

Hoad et al., "Human Nutrition and Metabolism, In Vivo Imaging of Intragastric Gelation and Its Effect on Satiety in Humans", American Society for Nutritional Sciences, 2004, pp. 2293-2300.

Jeukendrup, "Carbohydrate feeding during exercise", European Journal of Sport Science, 2008, 8:2, 77-86, DOI: 10.1080/17461390801918971.

Paxman et al., "Daily ingestion of alginate reduces energy intake in free-living subjects", Appetite, 2008, 51: 713-719.

Pelkman et al., "Novel calcium-gelled, alginate-pectin beverage reduced energy intake in nondieting overweight and obese women: interactions with dietary restraint status", Am J Clin Nutr, 2007, 86:1595-1602.

Pfeiffer et al., "Nutritional Intake and Gastrointestinal Problems during Competitive Endurance Events", Official Journal of the American College of Sports Medicine, pp. 344-351.

International-Type Search Report issued for Swedish Patent Application No. 1630098-0, dated Jun. 12, 2016.

Swedish Search Report issued for Swedish Patent Application No. 1730056-7, dated Sep. 15, 2017.

Barber et al., "Pectin-Alginate Does Not Further Enhance Exogenous Carbohydrate Oxidation in Running", Medicine & Science in Sports & Exercise, 2019, Publish Ahead of Print, DOI: 10.1249/MSS.0000000000002262.

Marciani et al., "Alginate and HM-pectin in sports-drink give rise to intra-gastric gelation in vivo", Food & Function, 2019, 10: 7892.

Oliveira et al., "Carbohydrate-Dependent, Exercise-Induced Gastrointestinal Distress", Nutrients, 2014, 6: 4191-4199.

Pfeiffer et al., "Nutritional Intake and Gastrointestinal Problems during Competitive Endurance Events", Medicine & Science in Sports & Exercise, 2012, pp. 344-351, DOI: 10.1249/MSS.0b013e31822dc809.

Rowe et al., "Glucose and Fructose Hydrogel Enhances Running Performance, Exogenous Carbohydrate Oxidation and Gastrointestinal Tolerance", Med Sci Sports Exerc. Jul. 30, 2021. doi: 10.1249/MSS.0000000000002764. Epub ahead of print. PMID: 34334720.

Grant et al., "Biological Interactions Between Polysaccharides and Divalent Cations: The Egg-Box Model", FEBS Letters, 1973, 32(1): 195-198.

Ström et al., "Physico-Chemical Properties of Hydrocolloids Determine Their Appetite Effects", In Gums and stabilizers for the food industry 15, Eds. P. A. Williams, G. O. Phillips, Royal Chemical Society, 2009, pp. 341-355.

Wan et al., "Calcium Concentration Effects on the Mechanical and Biochemical Properties of Chondrocyte-Alginate Constructs", Cell Mol Bioeng., 2008, 1(1): 93-102. doi:10.1007/s12195-008-0014-x.

Third Party Observation for European patent application No. EP20170720136, submitted on Jun. 17, 2019.

Third Party Observation for European patent application No. EP20170720136, submitted on Jun. 26, 2019.

\* cited by examiner

NUTRITIONAL SUPPLEMENTS

CROSS-REFERENCE TO RELATED APPLICATIONS

This application is a § 371 national phase of International Application No. PCT/EP2017/060261, filed on Apr. 28, 2017, which claims the benefit of Swedish Patent Application No. 1630098-0, filed on Apr. 29, 2016 and Swedish Patent Application No. 1730056-7, filed on Mar. 3, 2017, which applications are incorporated by reference herein.

BACKGROUND TO THE INVENTION

Athletes participating in endurance events are required to sustain relatively high work rates for a prolonged period, which results in high sweat rates and energy expenditure. To delay the onset of fatigue and optimize prolonged endurance performance, athletes are recommended to compensate fluid and electrolyte losses as well as to fuel the body with energy from carbohydrates.

Carbohydrate intake has been shown to improve endurance capacity and performance and athletes are advised to consume carbohydrate at rates of 0.7 g kg$^{-1}$ body weight per hour (30-60 g h$^{-1}$) during endurance events (American College of Sports Medicine. Med Sci Sports Exerc. 2009, 41:709-31). An alternative contemporary recommendation suggests even higher carbohydrate intake rates of up to 90 g h$^{-1}$ for athletes competing in intense (ultra)endurance events longer than 2 h (Jeukendrup Eur J Sport Sci 2008, 0.8:77-86).

High carbohydrate intakes rates are significantly positively correlated with performance, but at the same time, are linked to gastrointestinal symptoms such as higher scores of nausea and flatulence (Pfeiffer Med Sci Sports Exerc 2012, 44:344-351).

Accordingly, there is a demand for carbohydrate containing nutritional supplements that allows high carbohydrate intake without causing unwanted gastrointestinal symptoms.

DESCRIPTION OF THE INVENTION

The present invention solves the problem by providing nutritional supplements comprising alginate, preferably in combination with pectin, which will form hydrogels in the stomach when exposed to the low pH of the gastric juice. The formation of a hydrogel will lead to delayed release of sugars and other active ingredients in the stomach. The nutritional supplements can comprise high concentrations of sugars and complex carbohydrates without causing unwanted gastrointestinal symptoms.

The composition of the nutritional supplements according to the invention are selectively chosen to provide both a low viscosity at consumption in combination with effective gelling when exposed to the low pH of the gastric juice.

The first aspect of the present invention provides liquid nutritional supplements comprising;
a) 0.05 to 2.0 wt % alginate
b) 0.03 to 1.5 wt % pectin, and
c) 5 to 25 wt % active ingredients, where the active ingredients are selected from one or more of the ingredients consisting of sugars, complex carbohydrates, electrolytes, and amino acids,
for use as sport drinks, or as energy drinks.

More specifically for providing carbohydrates for energy before, during and/or after exercise avoiding gastrointestinal symptoms, such as flatulence and nausea.

In one preferred embodiment the liquid nutritional supplement consists essentially of;
a) 0.05 to 2.0 wt % alginate
b) 0.03 to 1.5 wt % pectin, and
c) 5 to 25 wt % active ingredients, where the active ingredients are selected from one or more of the ingredients consisting of sugars, complex carbohydrates, electrolytes, and amino acids.

The alginate content can be 0.05 to 2.0 wt %, such as 0.2 to 0.8 wt %, preferably 0.5 to 0.7 wt %, or 0.3 to 0.6 wt %.

The alginate is preferably high-guluronate (high-G) alginate.

The pectin content can be 0.03 to 1.5 wt %, such as 0.05 to 1.0 wt %, preferably 0.2% to 0.4 wt %, or 0.3 to 0.5 wt %

The pectin is preferably high-ester/high-methylated (HE/HM) pectin.

The sugar content can be 5 to 25 wt %, such as 7 to 18 wt %. The sugars can be selected from, but are not limited to, glucose, fructose, sucrose and isomaltulose.

If present the glucose to fructose ratio can be from 10:1 to 1:10, such as 4:1 to 1:1, preferably 2:1.

The complex carbohydrates can be selected from starch, maltodextrin, glucose syrup and fructose syrup.

The content of complex carbohydrates can be 0 to 40 wt %, such as 4 to 9 wt %.

The electrolytes can be selected from chloride, phosphate and citrate salts of sodium potassium, zinc and magnesium.

Optional the nutritional supplements can comprise vitamins, such as vitamin C.

Optionally the nutritional supplements can comprise flavouring, such as citrus or vanilla aromas.

In one preferred embodiment the liquid nutritional supplement comprises,
a) 0.05 to 0.7 wt % alginate,
b) 0.03 to 0.5 wt % pectin, and
c) 7 to 15 wt % of active ingredients consisting of 4 to 6 wt % fructose, 8 to 12 wt % maltodextrin, and 0 to 1 wt % sodium chloride.

In another preferred embodiment the liquid nutritional supplement comprises,
a) 0.05 to 0.6 wt % alginate,
b) 0.03 to 0.4 wt % pectin, and
c) 12 to 18 wt % active ingredients, where the active ingredients are selected from one or more of the ingredients consisting of sugars, complex carbohydrates, electrolytes, and amino acids.

The liquid nutritional supplements according to the first aspect of the invention in the form of sports drinks or energy drinks are intended to be consumed in volumes from 100 ml to 500 ml, such as in volumes from 120 ml to 350 ml.

The second aspect of the present invention provides solid nutritional supplements comprising;
a) 0.2 to 16 wt % alginate,
b) 0.12 to 12 wt % pectin, and
c) 75 to 99 wt % active ingredients, where the active ingredients are selected from one or more of the ingredients consisting of sugars, complex carbohydrates, mineral salts, and amino acids.

In one embodiment the solid nutritional supplement can consist essentially of;
a) 0.2 to 16 wt % alginate,
b) 0.12 to 12 wt % pectin, and
c) 75 to 99 wt % active ingredients, where the active ingredients are selected from one or more of the ingredients consisting of sugars, complex carbohydrates, mineral salts, and amino acids.

The solid nutritional supplements according to this second aspect of the invention are intended to be dissolved in a defined volume of water resulting in liquid nutritional supplements according to the first aspect of the invention for use as sport drinks, or as energy drinks.

The solid nutritional supplement can comprise 1 to 10 wt % water bound to the alginate, pectin, carbohydrates or other active ingredients.

For a nutritional supplement intended to contain 7 to 18 wt % of active ingredients after dissolution in added water, the alginate content can be 0.2 to 16 wt %, 0.6 to 6 wt %, such as 1.0 to 4 wt %, more preferably 1.5 to 2.7 wt %, and the pectin content can be 0.12 to 12 wt %, 0.4 to 4 wt %, such as 0.8 to 2.4 wt %, more preferably 1.0 to 1.8 wt %.

The alginate is preferably high-guluronate (high-G) alginate.

The pectin is preferably high-methylated (HM) pectin.

The sugar content can be 25 to 95 wt %, such as 30 to 75 wt %. The sugars can be selected from glucose, fructose, sucrose, isomaltulose.

If present the glucose to fructose ratio can be from 10:1 to 1:10, such as 4:1 to 1:1, preferably 2:1 as long as complex carbohydrates are not included.

The complex carbohydrates can be selected from starch, maltodextrin, dried glucose syrup and dried fructose syrup.

The content of complex carbohydrates can be 0 to 80 wt %, such as 30 to 65 wt %.

The mineral salts can be selected from chloride, phosphate and citrate salts of sodium potassium, calcium, zinc and magnesium.

Optional the nutritional supplements can comprise vitamins, such as vitamin C.

Optionally the nutritional supplements can comprise a flavouring, such as citrus or vanilla aroma.

In one preferred embodiment the solid nutritional supplement intended to contain 18 wt % of active ingredients after dissolution in added water, comprises;
 a) 0.4 to 4.5 wt % alginate,
 b) 0.4 to 3.0 wt % pectin, and
 c) active ingredients consisting of 55 to 65 wt % glucose, 35 to 45 wt % fructose, and 0.5 to 3 wt % sodium chloride.

In one preferred embodiment the solid nutritional supplement intended to contain 12 wt % of active ingredients after dissolution in added water, comprises;
 a) 0.7 to 9.5 wt % alginate,
 b) 0.7 to 6.8 wt % pectin, and
 c) active ingredients consisting of 25 to 50 wt % isomaltulose, 40 to 80 wt % maltodextrin, and 1 to 4 wt % sodium chloride.

The third aspect of the present invention provides liquid nutritional supplements comprising;
 a) 0.05 to 0.15 wt % alginate
 b) 0.03 to 0.1 wt % pectin, and
 c) 5 to 25 wt % active ingredients, where the active ingredients are selected from one or more of the ingredients consisting of sugars, complex carbohydrates, electrolytes, and amino acids.

In one preferred embodiment the liquid nutritional supplement consists essentially of;
 a) 0.05 to 0.15 wt % alginate
 b) 0.03 to 0.1 wt % pectin, and
 c) 5 to 25 wt % active ingredients, where the active ingredients are selected from one or more of the ingredients consisting of sugars, complex carbohydrates, electrolytes, and amino acids.

The alginate content can be 0.05 to 0.15 wt %, more preferably 0.075 to 0.12 wt %. Most preferably the alginate content is 0.09 to 0.11 wt %.

The alginate is preferably high-guluronate (high-G) alginate.

The pectin content can be 0.03 to 0.1 wt %, more preferably 0.05 to 0.08 wt %.

The pectin is preferably high-ester/high-methylated (HE/HM) pectin.

Preferably the total content of alginate and pectin is less than 0.25 wt %, more preferably less than 0.20 wt %.

The sugar content can be 4 to 25 wt %, such as 7 to 18 wt %. The sugars can be selected from, but are not limited to, glucose, fructose, sucrose and isomaltulose.

If present the glucose to fructose ratio can be from 10:1 to 1:10, such as 4:1 to 1:1, preferably 2:1.

The complex carbohydrates can be selected from starch, maltodextrin, glucose syrup and fructose syrup.

The content of complex carbohydrates can be 0 to 40 wt %, such as 4 to 9 wt %.

The electrolytes can be selected from chloride, phosphate and citrate salts of sodium potassium, zinc and magnesium.

Optional the nutritional supplements can comprise vitamins, such as vitamin C.

Optionally the nutritional supplements can comprise flavouring, such as citrus or vanilla aroma.

The liquid nutritional supplements according to the third aspect of the invention can be in the form of sports drinks intended to be consumed in volumes from 100 ml to 500 ml, such as in volumes from 120 ml to 350 ml.

The fourth aspect of the present invention provides solid nutritional supplements comprising;
 a) 0.2 to 2.0 wt % alginate,
 b) 0.12 to 1.4 wt % pectin, and
 c) 75 to 99 wt % active ingredients, where the active ingredients are selected from one or more of the ingredients consisting of sugars, complex carbohydrates, mineral salts, and amino acids.

In one embodiment the solid nutritional supplement can consist essentially of;
 a) 0.2 to 2.0 wt % alginate,
 b) 0.12 to 1.4 wt % pectin, and
 c) 75 to 99 wt % active ingredients, where the active ingredients are selected from one or more of the ingredients consisting of sugars, complex carbohydrates, mineral salts, and amino acids.

The solid nutritional supplement can comprise 1 to 10 wt % water bound to the alginate, pectin, carbohydrates or other active ingredients.

The solid nutritional supplements according to this fourth aspect of the invention are intended to be dissolved in a defined volume of water resulting in a liquid nutritional supplement according to the third aspect of the invention.

The alginate is preferably high-guluronate (high-G) alginate.

The pectin is preferably high-methylated (HM) pectin.

For a nutritional supplement containing 7 to 15 wt % of active ingredients after dissolution in added water, the alginate content can be 0.3 to 2 wt %, such as 0.5 to 1.5 wt %, more preferably 0.7 to 1.0 wt %, and the pectin content can be 0.2 to 1.3 wt %, such as 0.3 to 0.9 wt %, more preferably 0.4 to 0.7 wt %.

For a nutritional supplement containing 12 to 18 wt % of active ingredients after dissolution in added water, the alginate content can be 0.25 to 1.25 wt %, such as 0.3 to 1.0 wt %, more preferably 0.45 to 0.8 wt %, and the pectin content of the solid formulation can be 0.15 to 0.9 wt %, such as 0.2 to 0.7 wt %, more preferably 0.25 to 0.5 wt %.

The sugar content can be 25 to 95 wt %, such as 30 to 75 wt %. The sugars can be selected from glucose, fructose, sucrose, isomaltulose.

If present the glucose to fructose ratio can be from 10:1 to 1:10, such as 4:1 to 1:1, preferably 2:1 as long as complex carbohydrates are not included.

The complex carbohydrates can be selected from starch, maltodextrin, dried glucose syrup and dried fructose syrup.

The content of complex carbohydrates can be 0 to 80 wt %, such as 30 to 65 wt %.

The mineral salts can be selected from chloride, phosphate and citrate salts of sodium potassium, calcium, zinc and magnesium.

Optional the nutritional supplements can comprise vitamins, such as vitamin C.

Optionally the nutritional supplements can comprise a flavouring, such as citrus or vanilla aroma.

In one preferred embodiment the solid nutritional supplement intended to contain 18 wt % of active ingredients after dissolution in added water, comprises;
  a) 0.25 to 0.8 wt % alginate,
  b) 0.25 to 0.5 wt % pectin, and
  c) active ingredients consisting of 55 to 65 wt % glucose, 35 to 45 wt % fructose, and 0.5 to 3 wt % sodium chloride.

In one preferred embodiment the solid nutritional supplement intended to contain 12 wt % of active ingredients after dissolution in added water, comprises;
  a) 0.4 to 1.3 wt % alginate,
  b) 0.4 to 0.9 wt % pectin, and
  c) active ingredients consisting of 25 to 50 wt % isomaltulose, 40 to 80 wt % maltodextrin, and 1 to 4 wt % sodium chloride.

The fifth aspect of the present invention provides liquid nutritional supplements comprising;
  a) 0.1 to 3.5 wt % alginate, and
  b) 10 to 25 wt % active ingredients, where the active ingredients are selected from one or more of the ingredients consisting of sugars, complex carbohydrates, electrolytes, and amino acids.

In one preferred embodiment the liquid nutritional supplement consists essentially of;
  a) 0.1 to 3.5 wt % alginate, and
  b) 10 to 25 wt % active ingredients, where the active ingredients are selected from one or more of the ingredients consisting of sugars, complex carbohydrates, electrolytes, and amino acids.

The alginate content can be 0.1 to 3.5 wt %, such as 0.2 to 0.8 wt %, preferably 0.3 to 0.7 wt %, or 0.5 to 0.6 wt %.

The alginate is preferably high-guluronate (high-G) alginate.

The sugar content can be 5 to 25 wt %, preferably 7 to 18 wt %, which can provide sports drinks intended to be consumed in volumes from 100 ml to 500 ml, such as in volumes from 120 ml to 350 ml.

The sugars can be selected from, but are not limited to, glucose, fructose, sucrose and isomaltulose.

If present the glucose to fructose ratio can be from 10:1 to 1:10, such as 4:1 to 1:1, preferably 2:1.

The complex carbohydrates can be selected from starch, maltodextrin, glucose syrup and fructose syrup.

The content of complex carbohydrates can be 0 to 25 wt %, such as 4 to 9 wt %.

The electrolytes can be selected from chloride, phosphate and citrate salts of sodium potassium, calcium, zinc and magnesium.

Optional the nutritional supplements can comprise vitamins, such as vitamin C.

Optionally the nutritional supplements can comprise a flavouring, such as citrus or vanilla aromas.

The sixth aspect of the present invention provides solid nutritional supplements comprising;
  a) 0.5 to 25 wt % alginate, and
  b) 75 to 99 wt % active ingredients, where the active ingredients are selected from one or more of the ingredients consisting of sugars, complex carbohydrates, mineral salts, and amino acids.

In one embodiment the solid nutritional supplement can consist essentially of;
  a) 0.5 to 25 wt % alginate, and
  b) 75 to 99 wt % active ingredients, where the active ingredients are selected from one or more of the ingredients consisting of sugars, complex carbohydrates, mineral salts, and amino acids.

The solid nutritional supplement can comprise 1 to 10 wt % water bound to the alginate, pectin, carbohydrates or other active ingredients.

The solid nutritional supplements according to this sixth aspect of the invention are intended to be dissolved in a defined volume of water resulting in a liquid nutritional supplement according the fifth aspect of the invention.

The alginate content can be 0.5 to 25 wt %, such as 1.0 to 15 wt %.

The alginate is preferably high-guluronate (high-G) alginate.

The sugar content can be 75 to 25 wt %, preferably 7 to 18 wt %, which can provide sports drinks intended to be consumed in volumes from 100 ml to 500 ml, such as in volumes from 120 ml to 350 ml.

The sugars can be selected from, but are not limited to, glucose, fructose, sucrose and isomaltulose.

If present the glucose to fructose ratio can be from 10:1 to 1:10, such as 4:1 to 1:1, preferably 2:1.

The complex carbohydrates can be selected from starch, maltodextrin, glucose syrup and fructose syrup.

The content of complex carbohydrates can be 0 to 25 wt %, such as 4 to 9 wt %.

The mineral salts can be selected from chloride, phosphate and citrate salts of sodium potassium, calcium, zinc and magnesium.

Optional the nutritional supplements can comprise vitamins, such as vitamin C.

Optionally the nutritional supplements can comprise a flavouring, such as citrus or vanilla aromas.

Another aspect of the present invention provides use of a nutritional supplement according to the invention as sports drinks, energy drinks, beverages or food products.

Another aspect of the present invention provides use of a nutritional supplement according to the invention in the manufacture of sports drinks, energy drinks, beverages or food products.

LEGENDS TO THE FIGURES

FIG. 1. Release of sucrose from one formulation in simulated gastric fluid (SGF) repeated in three experiments. Mean and standard deviation are plotted against time after start of experiment. (-○-). Formulation consisted of 12 wt % sucrose, 0.4 wt % alginate and 0.6 wt % HM-pectin. As a reference, corresponding to 100% release, the formulation was mixed with tap water (---).

Figure 2:
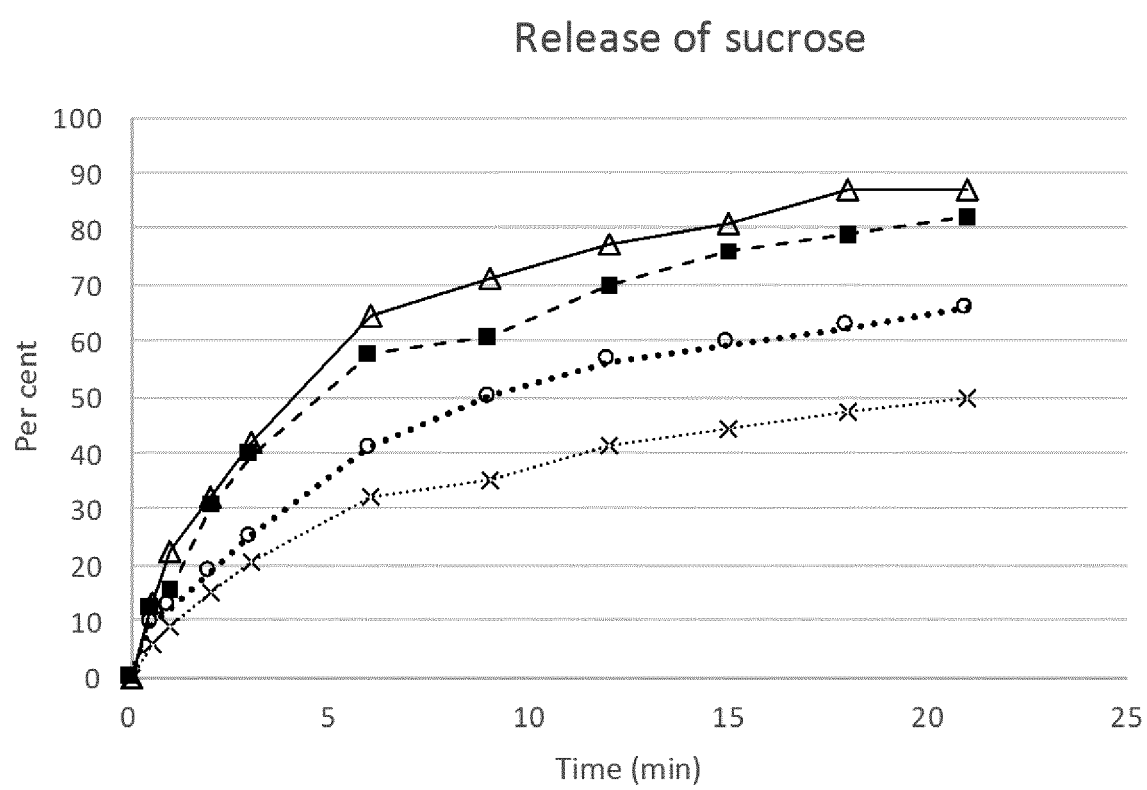

FIG. 2. Release of sucrose from four different formulations in simulated gastric fluid (SGF). BRIX concentration measured in SGF given as percentage of BRIX-concentration of reference solution.
Exp. I: 0.2 wt % alginate, 0.3 wt % pectin (••○••)
Exp. II: 0.1 wt % alginate, 0.15% pectin (--Δ--)
Exp. III: 0.125 wt % alginate, 0.375 wt % pectin (--■--)
Exp. IV: 0.4 wt % alginate, 0.6 wt % pectin (••X••)

Figure 3:
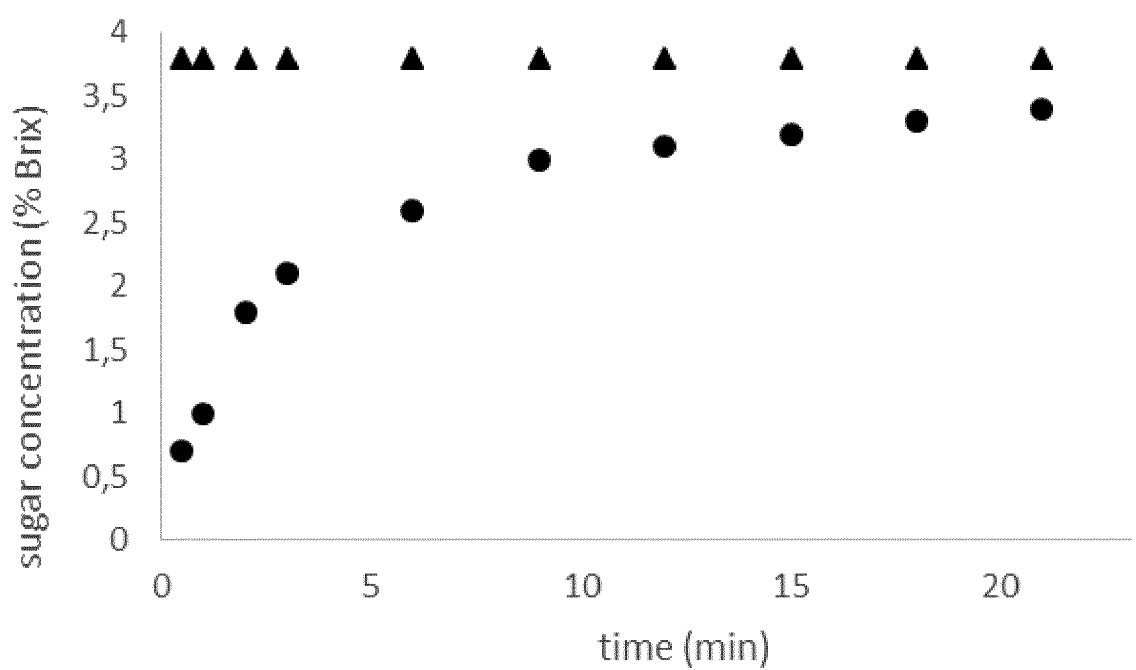

FIG. 3. Release of sucrose from one formulation in simulated gastric fluid (SGF) plotted against time after start of experiment. (-●-). Formulation consisted of 12 wt % sucrose, 0.18 wt % alginate+HM-pectin. As a reference, corresponding to 100% release, the formulation was mixed with tap water (-▲-).

DETAILED DESCRIPTION OF THE INVENTION

Upon digestion the liquid nutritional supplements comprising pectin and alginate will form a gel in the stomach when exposed to the low pH of gastric juice. The gel formation will lead to slow release of sugars in the stomach (FIGS. 1, 2 and 3), avoiding unwanted gastrointestinal symptoms.

Pectin

Pectin, also known as pectic polysaccharides, is a structural hetero polysaccharide contained in the cell wall of terrestrial plant, and rich in galacturonic acid. Several distinct polysaccharides have been identified and characterised within the pectic group. Homogalacturonans are linear chains of α-(1-4)-linked D-galacturonic acid. Rhamnogalacturonan I pectins (RG-I) contain a backbone of the repeating disaccharide: →4)-α-D-galacturonic acid-(1,2)-α-L-rhamnose-(1→. From many of the rhamnose residues, sidechains of various neutral sugars branch off. The neutral sugars are mainly D-galactose, L-arabinose and D-xylose, with the types and proportions of neutral sugars varying with the origin of pectin. Another structural type of pectin is rhamnogalacturonan II (RG-II), which is a less frequent, complex, highly branched polysaccharide. Rhamnogalacturonan II can be classified within the group of substituted galacturonans since the rhamnogalacturonan II backbone is made exclusively of D-galacturonic acid units.

Isolated pectin has a molecular weight of typically 60-150,000 g/mol, varying with origin and extraction conditions.

The carboxyl group of the homogalacturonan is, in nature, highly esterified with methyl groups (typically ~70%). The proportion between methylated and non-methylated carboxyl groups, or the degree of methylation (DM) depends among other aspects on maturity of the plant. Once the homogalacturonan is extracted from the plant, the DM is routinely varied, either increased via dispersion in methanol under acid conditions or decreased via acid, alkali or enzymic treatment. The ratio of esterified to non-esterified galacturonic acid determines the gelation behavior of pectin. Pectin with a high degree of methyl esters (>50%) are denoted high methoxy pectin (HM pectin) or high ester pectin (HE pectin) and those with low methoxy content (<50%) as low methoxy pectin (LM pectin) or low ester pectin (LE pectin).

The non-esterified galacturonic acid units can be either free acids (carboxyl groups) or salts with sodium, potassium, or calcium. The salts of partially esterified pectins are called pectinates, if the degree of esterification is below 5 percent the salts are called pectates, the insoluble acid form, pectic acid. All forms of pectin, including HM-pectin, LM-pectin, and amidated LM-pectin, can be used according to the invention. The preferred pectin is HM-pectin Alginates Alginate, also called algin or alginic acid, is an anionic polysaccharide distributed widely in the cell walls of brown algae. Alginate acid is a linear copolymer with homopolymeric blocks of (1-4)-linked β-D-mannuronate (M) and its C-5 epimer α-L-guluronate (G) residues, respectively, covalently linked together in different sequences or blocks. The monomers can appear in homopolymeric blocks of consecutive G-residues (G-blocks), consecutive M-residues (M-blocks) or alternating M and G-residues (MG-blocks). All forms of alginate, including high-G alginate (>50% G) and high-M alginate (>50% M), can be used according to the invention. The preferred alginate is high-G alginate. The counter ion can e.g. be sodium (sodium-alginate), potassium (potassium-alginate), ammonium (ammonium alginate) or other suitable monovalent cations, or mixtures thereof.

Sugars

Sugars that can be used according to invention, but not limited to, are monosaccharides like glucose, fructose, galactose, disaccharides like lactose, maltose, sucrose, lactulose, trehalose, cellobiose.

Complex Carbohydrates

Complex carbohydrates that can be used according to the invention, but not limited to, are components of starch like amylose and amylopectin, maltodextrin, glucose syrup and fructose syrup.

EXAMPLES

Material and Methods

Experiment 1

Glucose (12 g), fructose (6 g), alginate (0.4 g) and pectin (0.6 g) were mixed with water (total weight 100 g) by shaking in a small bottle. After at least 1 min, 15 ml of the mixture was poured into 40 ml of simulated gastric fluid (SGF) in a 60-ml cylindrical container (inner diameter 26 mm, length 120 mm) which was slowly rotated (16 rpm). Samples (0.20 ml) of the SGF were taken at 0.5, 1, 2, 3, 6, 9, 12, 15, 18 and 21 min. As a reference, an aqueous solution containing all ingredients including SGF, but excluding alginate and pectin, was used. Optical density and corresponding BRIX-concentration was measured by an ATAGO PAL-3 refractometer.

Experiment 2

Same as experiment 1 but with only 0.18 g alginate+pectin.

Results

The formulations formed gels in contact with SGF.

Using a formulation containing 0.4 wt % alginate and 0.6 wt % pectin, free sucrose concentration in SGF after 21 min was less than 50% of the reference (FIG. 1). The rate of release was dependent on the amount of the gelling agent alginate and pectin. (FIG. 2 and FIG. 3).

The invention claimed is:
1. A method for providing carbohydrates to an athlete, comprising:
consuming a sports drink before, during and/or after exercise, wherein the sports drink comprises, dissolved in water:

a) 0.05 to 0.3 wt % alginate
b) 0.03 to 0.2 wt % pectin, and
c) 5 to 25 wt % active ingredients, wherein the active ingredients are selected from one or more of the ingredients consisting of sugars and complex carbohydrates, wherein the sports drink gels in gastric juice and is free of calcium, zinc and magnesium, and wherein the sports drink optionally further comprises electrolytes and/or amino acids.

2. The method according to claim 1, wherein the alginate content of the sports drink is 0.05 to 0.15 wt %.

3. The method according to claim 1, wherein the pectin content of the sports drink is 0.03 to 0.1 wt %.

4. The method according to claim 1, wherein the total content of alginate and pectin in the sports drink is less than 0.25 wt %.

5. The method according to claim 1, wherein the content of active ingredients in the sport drink is 7 to 18 wt %.

6. The method according to claim 1, wherein the sugar content in the sports drink is 4 to 25 wt %, and the content of complex carbohydrates in the sports drink is 4 to 9 wt %.

7. The method according to claim 1, wherein the alginate is high-guluronate (high-G) alginate.

8. The method according to claim 1, wherein the pectin is high-methoxy pectin.

9. The method according to claim 1, wherein the sugars comprise at least one or more of glucose, fructose, sucrose and isomaltose.

10. The method according to claim 1, wherein the complex carbohydrates comprise at least one or more of starch, maltodextrin, glucose syrup and fructose syrup.

11. The method according to claim 10, wherein the complex carbohydrates comprise maltodextrin.

12. The method according to claim 1, wherein the drink comprises one or more salts of sodium or potassium.

13. The method according to claim 1, comprising:
dissolving a solid composition in water to produce the sports drink, wherein the solid composition comprises:
(i) 0.5 to 1.5 wt % alginate,
(ii) 0.3 to 1.0 wt % pectin, and
(iii) 75 to 99 wt % active ingredients,
and wherein the solid composition contains no calcium, zinc or magnesium and optionally further comprises mineral salts and/or amino acids.

14. The method according to claim 13, comprising:
providing the sports drink to the athlete before, during and/or after exercise.

15. The method according to claim 13, wherein the sugar content of the solid composition is 25 to 95 wt %.

16. The method according to claim 13, wherein the sugar content of the solid composition is 30 to 75 wt %.

17. The method according to claim 13, wherein the complex carbohydrates content of the solid composition is up to 80 wt %.

18. The method according to claim 13, wherein the complex carbohydrates content of the solid composition is 30 to 65 wt %.

19. The method according to claim 13, wherein the mineral salts comprise one or more salts of sodium or potassium.

20. A sports drink comprising, dissolved in water:
a) 0.05 to 0.3 wt % alginate
b) 0.03 to 0.2 wt % pectin, and
c) 5 to 25 wt % active ingredients, wherein the active ingredients are selected from one or more of the ingredients consisting of sugars and complex carbohydrates, wherein the sports drink gels in gastric juice and is free of calcium, zinc and magnesium, wherein the sports drink optionally further comprises electrolytes and/or amino acids; and
wherein the sugar content in the sports drink is 4 to 25 wt %, and the content of complex carbohydrates in the sports drink is 4 to 9 wt %.

21. The sports drink according to claim 20, wherein the alginate content of the sports drink is 0.05 to 0.15 wt %.

22. The sports drink according to claim 20, wherein the pectin content of the sports drink is 0.03 to 0.1 wt %.

23. The sports drink according to claim 20, wherein the total content of alginate and pectin in the sports drink is less than 0.25 wt %.

24. The sports drink according to claim 20, wherein the content of active ingredients in the sport drink is 7 to 18 wt %.

25. The sports drink according to claim 20, wherein the alginate is high-guluronate (high-G) alginate.

26. The sports drink according to claim 20, wherein the pectin is high-methoxy pectin.

27. The sports drink according to claim 20, wherein the sugars comprise at least one or more of glucose, fructose, sucrose and isomaltose.

28. The sports drink according to claim 20, wherein the complex carbohydrates comprise at least one or more of starch, maltodextrin, glucose syrup and fructose syrup.

29. The sports drink according to claim 28, wherein the complex carbohydrates comprise maltodextrin.

30. The sports drink according to claim 20, wherein the drink comprises one or more salts of sodium or potassium.

* * * * *